(12) United States Patent  (10) Patent No.: US 7,531,994 B2
Itoh  (45) Date of Patent: *May 12, 2009

(54) CONSTANT VOLTAGE REGULATOR FOR GENERATING A LOW VOLTAGE OUTPUT

(75) Inventor: Kohzoh Itoh, Kasugai (JP)

(73) Assignee: Ricoh Company, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/071,579

(22) Filed: Feb. 22, 2008

(65) Prior Publication Data

US 2008/0150501 A1 Jun. 26, 2008

Related U.S. Application Data (63) Continuation of application No. 11/698,951, filed on Jan. 29, 2007, now Pat. No. 7,358,709.

(30) Foreign Application Priority Data

Feb. 1, 2006 (JP) ............................. 2006-024579

(51) Int. Cl.
G05F 1/40 (2006.01)
(52) U.S. Cl. ...................................... 323/273; 323/280
(58) Field of Classification Search ................. 323/273, 323/274, 275, 280, 281
See application file for complete search history.

(56) References Cited

U.S. PATENT DOCUMENTS 6,836,417 B2 * 12/2004 Hiraki et al. ................. 323/268
7,170,265 B2 * 1/2007 Whittaker .................... 323/267
7,248,025 B2 * 7/2007 Adachi ........................ 323/273
7,358,709 B2 * 4/2008 Itoh ............................ 323/273

FOREIGN PATENT DOCUMENTS

| JP | 2001-318724 | 11/2001 |
| JP | 2000-138489 | 5/2005 |
| JP | 3833440 | 7/2006 |

* cited by examiner

Primary Examiner—Adolf Berhane
(74) Attorney, Agent, or Firm—Dickstein Shapiro LLP (57) ABSTRACT

Constant voltage regulator includes an output terminal, an output transistor, an output voltage controller, and a switching circuit. The output terminal outputs a first voltage to an external host apparatus. The output transistor outputs a current in accordance with a signal. The output voltage controller amplifies a difference between a reference voltage and a feedback voltage produced in proportion to the first voltage, and outputs the amplified voltage to the control gate of the output transistor. The switching circuit selectively outputs one of a second voltage greater than the first voltage and a third voltage greater than the second voltage to a substrate gate of the output transistor in response to an operation mode switchable between a first mode in which an output current to the external host apparatus is smaller than a predetermined value and a second mode in which the output current is greater than the predetermined value.

21 Claims, 5 Drawing Sheets

CONSTANT VOLTAGE REGULATOR FOR GENERATING A LOW VOLTAGE OUTPUT

CROSS REFERENCE TO RELATED APPLICATIONS

The present application is a continuation of U.S. patent application Ser. No. 11/698,951, filed on Jan. 29, 2007 now U.S. Pat. No. 7,358,709, the disclosure of which is incorporated herein by reference in its entirety.

BACKGROUND OF THE INVENTION

1. Field of the Invention

The present invention generally relates to a constant voltage regulator, and more particularly to a constant voltage regulator that generates a relatively low voltage output and is capable of suppressing a leak current from an output transistor.

2. Discussion of the Related Art

Figure 1:
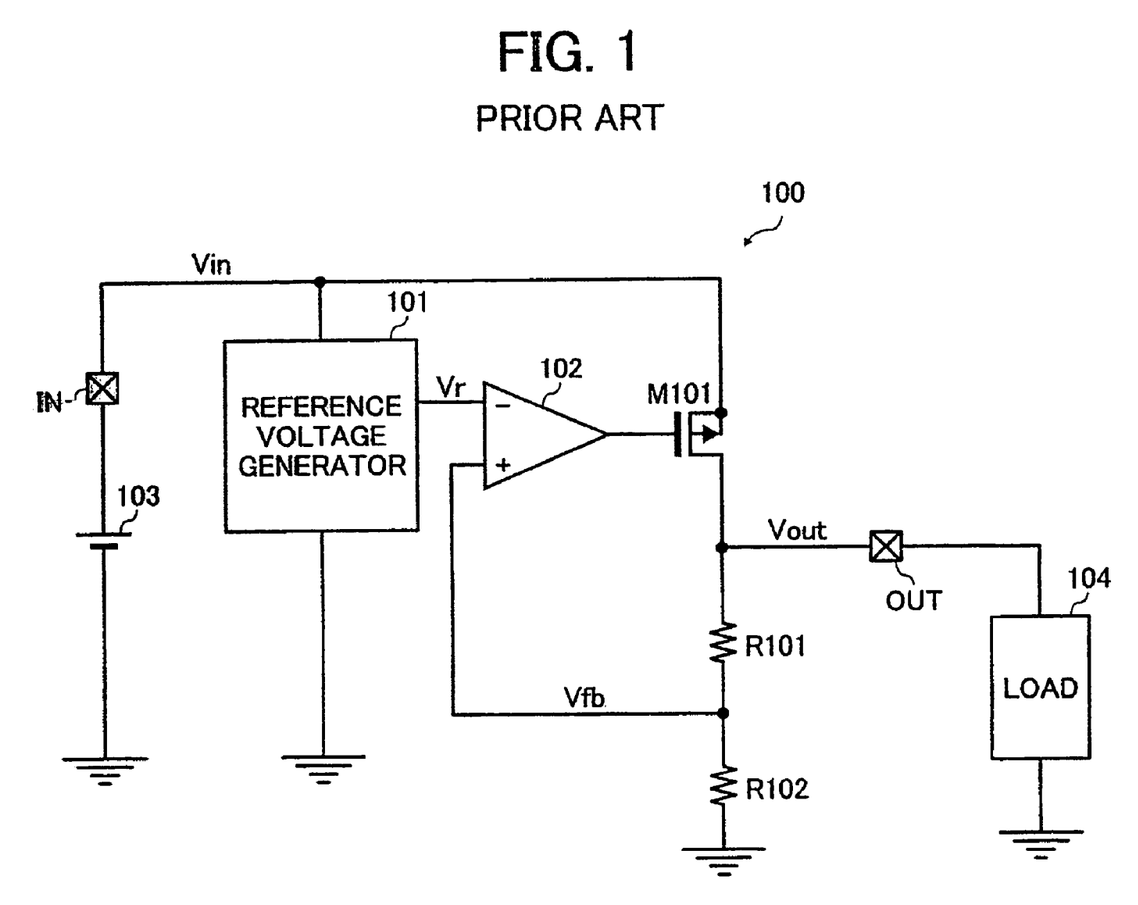
FIG. 1 is a circuit diagram of a background constant voltage regulator.

As one example of a background constant voltage regulator, FIG. 1 illustrates a background constant voltage regulator 100 which includes a reference voltage generator 101, an error amplifier 102, an output transistor M101, and resistors R1 and R2. The output transistor M101 includes a PMOS (p-channel metal oxide semiconductor) transistor. The output transistor M101 receives a control signal at its gate terminal so as to convert an input voltage Vin to an output voltage Vout to be supplied to a load 104 (e.g., an external host apparatus) through an output terminal OUT. The resistors R1 and R2 are connected in series between the output terminal OUT and a point of a ground voltage level. The error amplifier 102 amplifies a voltage difference between a predetermined reference voltage Vr generated by the reference voltage generator 101 and a divided voltage Vfb produced at a connection point between the resistors R1 and R2 based on the output voltage Vout. The amplified voltage difference is output as the control signal from the error amplifier 102 to the gate terminal of the output transistor M101 so that the operations of the output transistor M101 is controlled. The input voltage Vin is generated by an external power source 103 is supplied to the output transistor M101 through an input terminal IN of the constant voltage regulator 100. The input voltage Vin is ordinary supplied also to a substrate gate of the output transistor M101.

To address low power consumption of the load 104, the output voltage Vout is generally desired to be small. As a consequence, it is not uncommon to set the output voltage Vout to a considerably small voltage, even less than 1 volt, for example. Also, to address a high efficiency of the constant voltage regulator 100, the input voltage Vin and the output voltage Vout consequently have a small difference in voltage. Therefore, the output transistor M101 needs to have a relatively low threshold voltage Vth. It is generally known that a MOS (metal oxide semiconductor) transistor having a relatively low threshold voltage adversely increases a leak current when turned off.

If the output transistor M101 has a relatively large leak current, it may happen that the leak current exceeds a consumption current when the consumption current becomes extremely small in such a case where the load 104 is in a standby mode. In this case, the output voltage Vout may be increased to a value above a rated voltage.

Also, if the output transistor M101 has a relatively large leak current, the leak current flows through the load 104 and, therefore, some voltage is produced and appears at the output terminal OUT when the operations of the error amplifier 102 are stopped so as to turn off generating the output voltage Vout. As a result, the constant voltage regulator 100 cannot be turned off.

Figure 2:
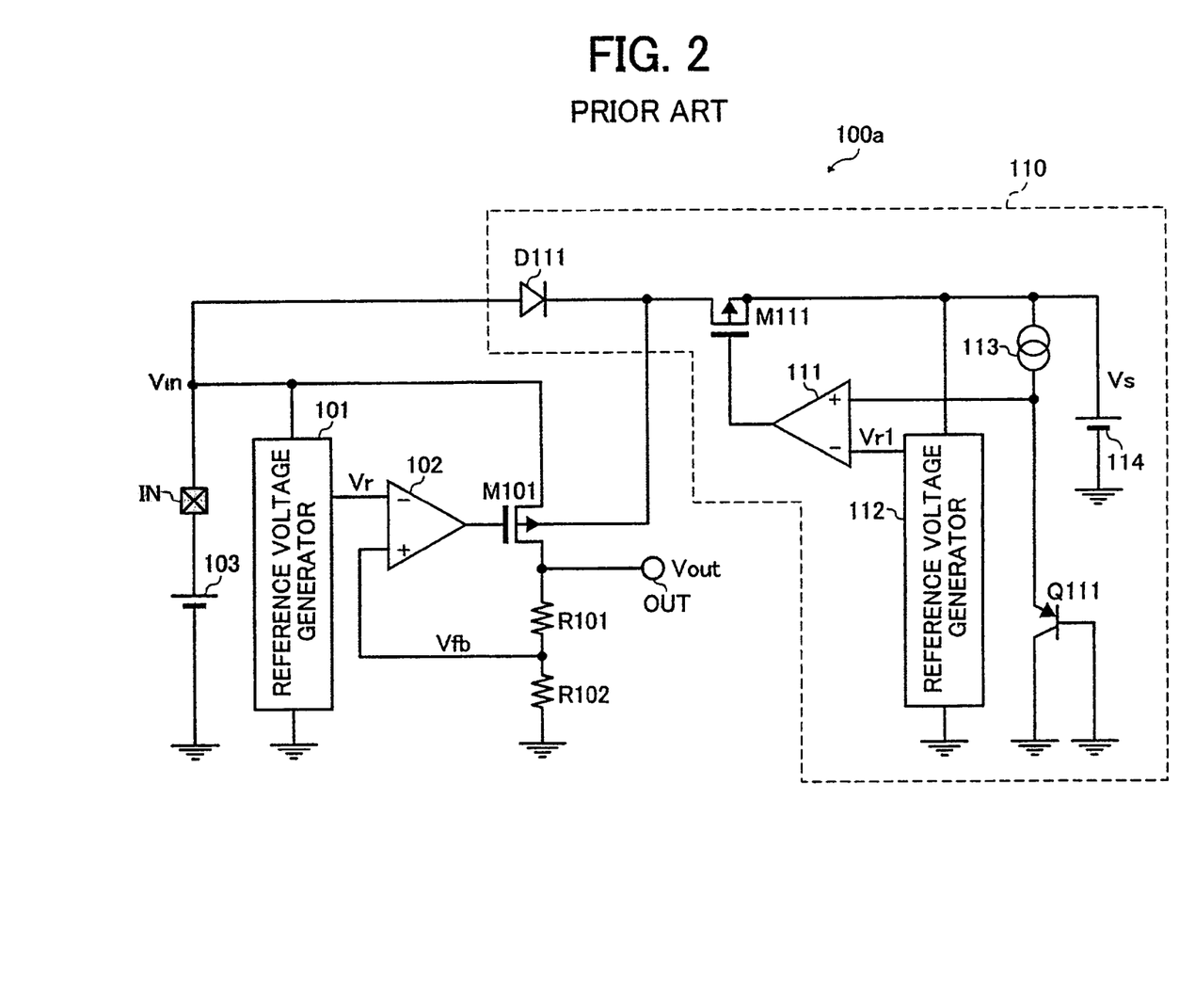
FIG. 2 is a circuit diagram of another background constant voltage regulator.

One known attempt to reduce the leak current generated by the PMOS transistor of the output transistor M101 is to apply as large voltage as possible to the substrate gate of the PMOS transistor of the output transistor M101. One example circuit of a constant voltage regulator 100a having such a structure is shown in FIG. 2. The constant voltage regulator 100a of FIG. 2 is similar to the constant voltage regulator 100 of FIG. 1, except for an addition of a voltage selection circuit 110. As illustrated in FIG. 2, the voltage selection circuit 110 includes a diode D111, a PMOS transistor M111, a comparator 111, a reference voltage generator 112, a current source 113, a PNP transistor Q111, and a direct-current source 114.

In the voltage selection circuit 110, the current source 113 and the PNP transistor Q111 form a temperature detector. At a regular temperature, the PMOS transistor M11 is turned off and the input voltage Vin is applied to the substrate gate of the output transistor M100 via the diode D111. A base-emitter voltage of the PNP transistor Q111 is lowered with an increase of temperature. When the base-emitter voltage of the PNP transistor Q111 is lowered below an output voltage Vrl of the reference voltage generator 112, an output signal of the comparator 111 falls to a low level. As a consequence, the PMOS transistor M111 is turned on, and a voltage Vs greater than the input voltage Vin is supplied from the direct-current source 114 to the substrate gate of the output transistor M101. In this way, the constant voltage regulator 100a addresses a problem of an increase leak current of the output transistor M101 at a high temperature.

However, the constant voltage regulator 100a produces another problem. When a voltage supplied to the substrate gate of the MOS transistor is increased, the MPS transistor may increase its threshold voltage Vth. That is, it is a dilemma. To address a low power consumption, the output transistor needs a small threshold voltage but produces a leak current instead. Then, to address a reduction of the leak current, the output transistor increases the voltage of the substrate gate which increases the threshold voltage.

SUMMARY OF THE INVENTION

In view of the foregoing, a constant voltage regulator according to the present invention includes an input terminal, an output terminal, an output transistor, an output voltage controller, and a switching circuit. The input terminal receives a third voltage. The output terminal outputs a first voltage to an external host apparatus. The output transistor outputs a current in accordance with a signal input to a control gate thereof. The output voltage controller generates a reference voltage, produces a feedback voltage in proportion to the first voltage, amplifies a difference voltage between the reference voltage and the feedback voltage, and outputs a signal of the amplified difference voltage to the control gate of the output transistor. The switching circuit selectively outputs one of a second voltage greater than the first voltage and the third voltage greater than the second voltage to a substrate gate of the output transistor in response to an operation mode of the constant voltage regulator switchable between a first mode in which a current to be output to the external host apparatus is smaller than a predetermined value and a second mode in which the current to be output to the external host apparatus is greater than the predetermined value.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, a constant voltage regulator 1 according to an embodiment of the present invention is explained.

Figure 3:
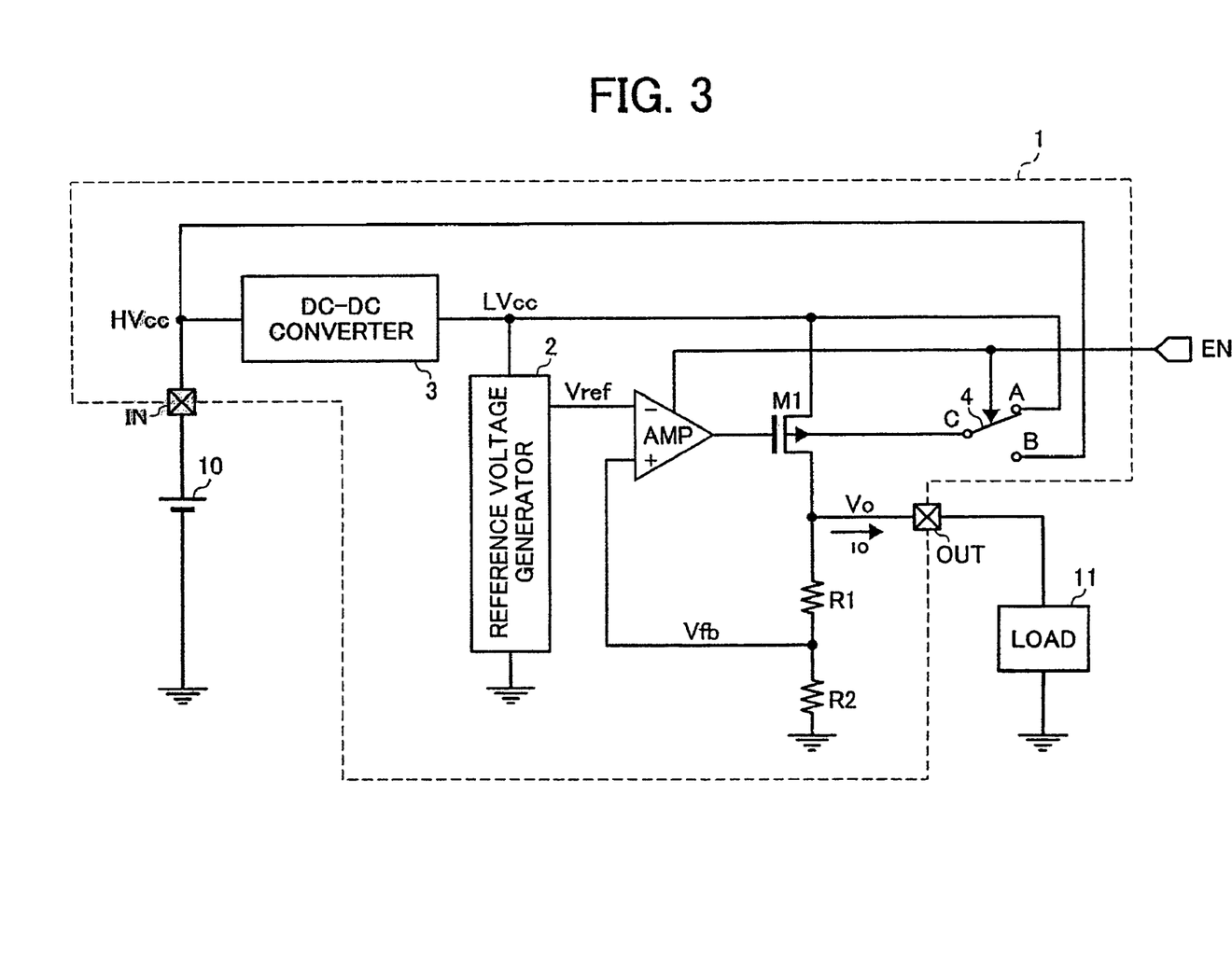
FIG. 3 is a circuit diagram of a constant voltage regulator according to an embodiment of the present invention.

As illustrated in FIG. 3, the constant voltage regulator 1 includes an input terminal IN and an output terminal OUT. The constant voltage regulator 1 is connected to a direct-current power source 10 to receive an input voltage HVcc of the direct power source 10 and is configured to generate an output voltage Vo connected to the input terminal IN and to output an output voltage to a load 11 (e.g., an external host apparatus) through the output terminal OUT.

The constant voltage regulator 1 further includes a reference voltage generator 2, resistors R1 and R2, an output transistor M1, an error amplifier AMP, a DC-to-DC (direct current to direct current) converter 3, and a switch 4. The constant voltage regulator 1 may be integrated into one IC chip.

In the constant voltage regulator 1, the reference voltage generator 2 generates a reference voltage Vref. The resistors R1 and R2 divides the output voltage Vo to generate a divided voltage Vfb. The output transistor M1 includes a PMOS (p-channel metal oxide semiconductor) transistor to control a current io to be output to the load 11 through the output terminal OUT. The error amplifier AMP controls the operations of the output transistor M1 so as to equalize the divided voltage Vfb to the reference voltage Vref. The DC-to-DC converter 3 converts the input voltage HVcc down to a constant voltage LVcc which is supplied to the reference voltage generator 2, the error amplifier AMP, and the output transistor M1. The switch 4 switches between the input voltage HVcc and the constant voltage LVcc as a voltage supplied to a substrate gate (alternatively called a back gate) of the output transistor M1.

In the constant voltage regulator 1, the reference voltage generator 2, the resistors R1 and R2, and the error amplifier AMP together form a circuit which may be referred to as an output voltage controller. The output voltage Vo at a constant voltage, the constant voltage LVcc, and the input voltage HVcc may be referred to as a first voltage, a second voltage, and a third voltage, respectively.

As illustrated in FIG. 3, the output transistor M1 is connected between an output terminal of the reference voltage generator 2 and the output terminal OUT. The resistors R1 and R2 are connected in series between the output terminal OUT and a point of a ground level. The error amplifier AMP has an output terminal connected to a gate of the output transistor M1, a non-inverse input terminal to which the divided voltage Vfb is input, and an inverse input terminal to which the reference voltage output from the reference voltage generator 2 is input. The switch 4 has a terminal A to receive the constant voltage LVcc and a terminal B to receive the input voltage HVcc. The switch 4 further has a common terminal C connected to the substrate gate of the output transistor M1. The error amplifier AMP is caused to operate in response to a control signal EN (i.e., an enable signal) supplied by an external controller (not shown). The switch 4 is also caused to switch between the input voltage HVcc and the constant voltage LVcc in accordance with the control signal EN. The control signal EN is a signal for changing a mode of the load 11 between a normal operation mode and a sleep mode. The power consumption is off course greater in the normal operation mode than in the sleep mode.

With the above-described structure, the constant voltage LVcc is supplied as a requisite minimum drain voltage for the operations of the output transistor M1 and is therefore set to a voltage near the output voltage Vo to achieve a high efficiency.

When the normal operation mode is selected according to the control signal EN, the common terminal C of the switch 4 is connected to the terminal A and the error amplifier AMP is caused to operate in the normal operation mode. In this condition, the substrate gate of the output transistor M1 is supplied the constant voltage LVcc from the DC-to-DC converter 3. Therefore, the threshold voltage Vth of the output transistor M1 becomes a relatively small voltage so that the constant voltage LVcc can control the output voltage Vo to a lower voltage. In this case, at the same time, the output transistor M1 increases the leak current. However, this leak current is not a problem because the leak current is far smaller than a current flowing through the load 11.

When the mode is changed to the standby mode according to the control signal EN, the error amplifier AMP is shifted to a low power consumption mode in which the error amplifier AMP has a reduced bias current. In addition, the connection of the common terminal C in the switch 4 is changed to the terminal B. In the standby mode, the current flowing through the load 11 becomes extremely small, but the substrate gate of the output transistor M1 is supplied the input voltage HVcc which is greater than the constant voltage LVcc. As a result, the threshold voltage Vth of the output transistor M1 becomes greater but the leak current becomes smaller. That is, the constant voltage regulator 1 does not cause the problem of increasing the output voltage Vo even with a decrease of the load current in the standby mode.

With the above-described structure, it is possible to apply such a small input-output voltage difference as the output voltage of less than 1.2 volts (or less than 1 volt), for example, and the input voltage of less than 2 volts, for example. Even with such small input-output voltage difference, the constant voltage regulator 1 can prevent an adverse effect of the leak current of the output transistor M1 to the output voltage Vo.

In the above-described example, the power consumption of the error amplifier AMP is reduced in the standby mode. As an alternative example, it may be possible to stop the operations of the error amplifier AMP to terminate the consumption current so as to halt the signal to be transmitted to the gate of the output transistor M1. In this case, it is also possible to stop the operation of the reference voltage generator 2 so as to terminate the consumption current of the reference voltage generator 2.

Figure 4:
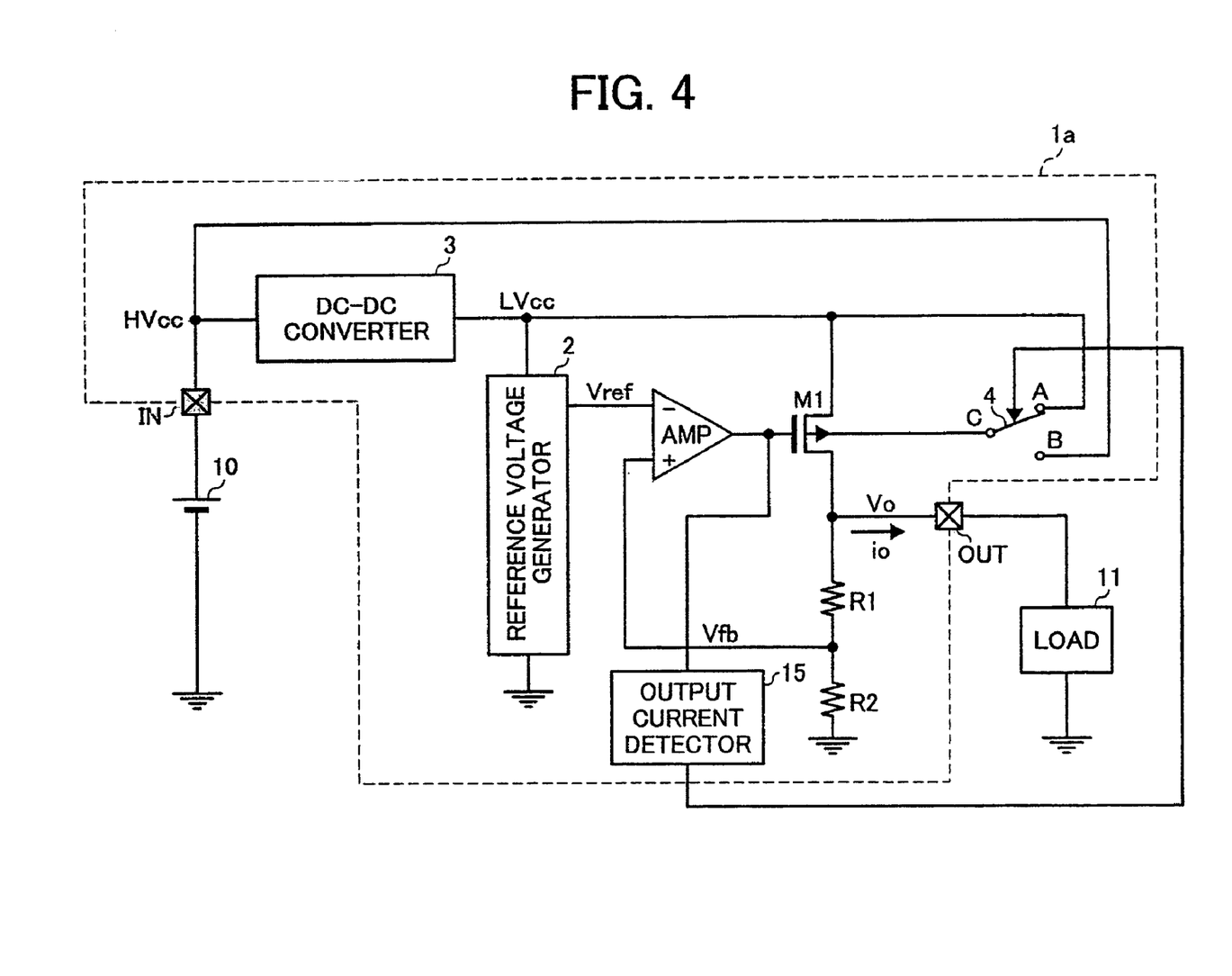
FIG. 4 is a circuit diagram of a constant voltage regulator according to an embodiment of the present invention.

With reference to FIG. 4, a constant voltage regulator 1a according to another embodiment of the present invention is explained. The constant voltage regulator 1 of FIG. 3 uses the control signal EN of an external controller to activate the switch 4. In comparison with it, the constant voltage regulator 1a of FIG. 4 uses a detection signal of a load current. As illustrated in FIG. 4, the constant voltage regulator 1a of FIG. 4 is similar to the constant voltage regulator 1 of FIG. 3, except for an output current detector 15.

As illustrated in FIG. 4, the output current detector 15 is connected between the output terminal of the error amplifier AMP and the common terminal of the switch 4. The output current detector 15 detects a current output from the output transistor M1 and causes the switch 4 to switch in accordance with a detected current. More specifically, the output current detector 15 receives an output signal generated by the error amplifier AMP, and generates a current in proportion to the current output from the output transistor M1 based on a voltage of the output signal received from the error amplifier AMP. Then, the output current detector 15 converts the generated current to a voltage so as to control the switch 4 in accordance with the converted voltage.

With the above-described structure, the constant voltage LVcc is supplied as a requisite minimum drain voltage for the operations of the output transistor M1 and is therefore set to a voltage near the output voltage Vo to achieve a high efficiency.

When the output current detector 15 determines that the output current of the output transistor M1 exceeds a predetermined value, the common terminal C of the switch 4 is connected to the terminal A. In this condition, the substrate gate of the output transistor M1 is supplied the constant voltage LVcc from the DC-to-DC converter 3. Therefore, the threshold voltage Vth of the output transistor M1 becomes a relatively small voltage so that the constant voltage LVcc can control the output voltage Vo to a lower voltage. In this case, at the same time, the output transistor M1 increases the leak current. However, this leak current is not a problem because the leak current is far smaller than a current flowing through the load 11.

When the output current detector 15 determines that the output current of the output transistor M1 is smaller than the predetermined value, the connection of the common terminal C in the switch 4 is changed to the terminal B. In this condition, the current flowing through the load 11 becomes extremely small, but the substrate gate of the output transistor M1 is supplied the input voltage HVcc which is greater than the constant voltage LVcc. As a result, the threshold voltage Vth of the output transistor M1 becomes greater so that a driving ability of the output transistor M1 is reduced, but the leak current becomes smaller. That is, the constant voltage regulator 1 does not cause the problem of increasing the output voltage Vo even with a decrease of the load current.

With the above-described structure, it is possible to apply such a small input-output voltage difference as the output voltage of less than 1.2 volts (or less than 1 volt), for example, and the input voltage of less than 2 volts, for example. Even with such small input-output voltage difference, the constant voltage regulator 1a can prevent an adverse effect of the leak current of the output transistor M1 to the output voltage Vo.

In the above-described example, the output current detector 15 causes to change the voltage applied to the substrate gate of the output transistor M1. As an alternative example, it may be possible to change the driving current of the error amplifier AMP at the same time so as to change an operation mode of the constant voltage regulator 1a.

Figure 5:
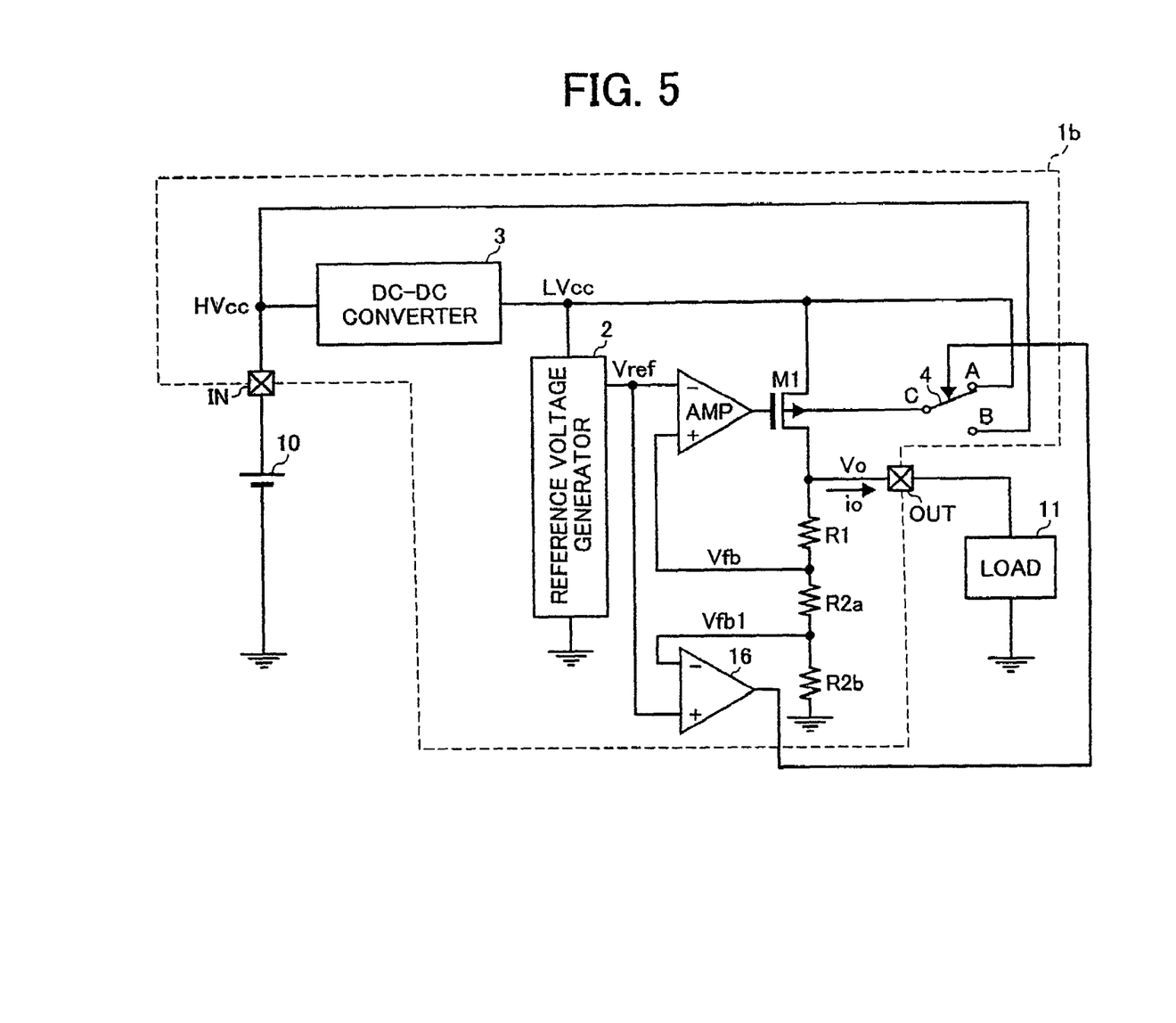
FIG. 5 is a circuit diagram of a constant voltage regulator according to an embodiment of the present invention.

With reference to FIG. 5, a constant voltage regulator 1b according to another embodiment of the present invention is explained. The constant voltage regulator 1 of FIG. 3 uses the control signal EN of an external controller to activate the switch 4. In comparison with it, the constant voltage regulator 1b of FIG. 5 performs a voltage detection of the output voltage Vo to activate the switch 4 in accordance with the detected voltage.

As illustrated in FIG. 5, the constant voltage regulator 1b is similar to the constant voltage regulator 1 of FIG. 3, except for resistors R2a and R2b and an output voltage detector 16. The resistors R2a and R2b are obtained by dividing the resistor R2 into two pieces and is installed in place of the resistor R2. The output voltage detector 16 determines whether a divided voltage Vfb1 produced at a connection point between the resistors R2a and R2b in proportion to the output voltage Vo is smaller than the reference voltage Vref, and activates the switch 4 in accordance with the determination result.

As illustrated in FIG. 5, the resistors R2a and R2b are connected in series together with the resistor R1 between the output terminal OUT and a point of the ground level. The output voltage detector 16 includes a comparator that has an inverse terminal connected to the connection point between the resistors R2a and R2b to receive the divided voltage Vfb1 and a non-inverse terminal connected to the output terminal of the reference voltage generator 2 to receive the reference voltage Vref. The comparator outputs a binary signal which activates the switch 4.

When the output voltage detector 16 determines that the divided voltage Vfb1 is smaller than the reference voltage Vref, the common terminal C of the switch 4 is connected to the terminal A. In this condition, the substrate gate of the output transistor M1 is supplied the constant voltage LVcc from the DC-to-DC converter 3. Therefore, the threshold voltage Vth of the output transistor M1 becomes a relatively small voltage so that the constant voltage LVcc can control the output voltage Vo to a lower voltage. In this case, at the same time, the output transistor M1 increases the leak current. However, this leak current is not a problem because the leak current is far smaller than a current flowing through the load 11.

When the output voltage detector 16 determines that the divided voltage Vfb1 is greater than the reference voltage Vref, the connection of the common terminal C in the switch 4 is changed to the terminal B. In this condition, the substrate gate of the output transistor M1 is supplied the input voltage HVcc which is greater than the constant voltage LVcc. As a result, the threshold voltage Vth of the output transistor M1 becomes greater so that a driving ability of the output transistor M1 is reduced, but the leak current becomes smaller. That is, the constant voltage regulator 1 does not cause the problem of increasing the output voltage Vo even with a decrease of the load current.

With the above-described structure, it is possible to apply such a small input-output voltage difference as the output voltage of less than 1.2 volts (or less than 1 volt), for example, and the input voltage of less than 2 volts (or less than 1.5 volts), for example. Even with such small input-output voltage difference and with a relatively large driver size, the constant voltage regulator 1a can prevent an adverse effect of the leak current of the output transistor M1 to the output voltage Vo.

In the above-described example, the output voltage detector 16 causes to change the voltage applied to the substrate gate of the output transistor M1. As an alternative example, it may be possible to change the driving current of the error amplifier AMP at the same time so as to change an operation mode of the constant voltage regulator 1a.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2006-024579 filed on Feb. 1, 2006 in the Japan Patent Office, the entire contents of which are incorporated by reference herein.

What is claimed is:

1. A constant voltage regulator, comprising:
    an output transistor configured to output a current to an external host apparatus, the output transistor comprises an output terminal configured to provide a first voltage and a substrate gate; and
    a switching circuit configured to selectively output one of a second voltage greater than the first voltage and a third voltage greater than the second voltage to the substrate gate of the output transistor in response to an operation mode of the constant voltage regulator switchable between a first mode in which the current to be output to the external host apparatus is smaller than a predetermined value and a second mode in which the current to be output to the external host apparatus is greater than the predetermined value.

2. The constant voltage regulator of claim 1, wherein:
    the output transistor comprises a P-channel metal oxide semiconductor transistor;
    the switching circuit is further configured to output the third voltage to the substrate gate in the first mode; and
    the switching circuit is further configured to output the second voltage to the substrate gate in the second mode.

3. The constant voltage regulator of claim 1, wherein the switching circuit is further configured to receive a control signal from an external apparatus to switch between the first and second modes.

4. The constant voltage regulator of claim 3, wherein:
    the first mode comprises a standby mode in which the external host apparatus is in a mode of a relatively low current consumption; and
    the second mode comprises an operation mode in which the external host apparatus performs a normal operation with a current consumption greater than in the first mode.

5. The constant voltage regulator of claim 3, wherein the output voltage controller is configured to be set to a state of a relatively low current consumption in the first mode and to a state in which a normal operation is performed and a current consumption is increased from the low current consumption in the first mode, in accordance with the control signal from the external apparatus.

6. The constant voltage regulator of claim 1, wherein the switching circuit is configured to detect an output current of the output transistor and to switch between the first and second modes in accordance with a result of the current detection.

7. The constant voltage regulator of claim 6, wherein the switching circuit comprises:

an output current detector configured to detect the output current of the output transistor and to generate a determination signal indicating a relationship between the detected output current and a first value; and
    a switch configured to selectively output one of the second voltage and the third voltage to the substrate gate of the output transistor based on the determination signal,
    wherein the switch is further configured to output the third voltage to the substrate gate of the output transistor if the detected current is less than the first value, and
    wherein the switch is further configured to output the second voltage to the substrate gate of the output transistor if the detected current is greater than the first value.

8. The constant voltage regulator of claim 1, wherein the switching circuit is configured to detect the first voltage and to determine whether to perform switching between the first and second modes based on a relationship between the first voltage and a fourth voltage.

9. The constant voltage regulator of claim 8, wherein the switching circuit comprises:
    an output voltage detector configured to detect the first voltage and to generate a determination signal indicating the relationship between the first voltage and the fourth voltage; and
    a switch configured to selectively output one of the second voltage and the third voltage to the substrate gate of the output transistor based on the determination signal,
    wherein the switch is further configured to output the third voltage to the substrate gate of the output transistor if the detected first voltage is less than the fourth voltage, and
    wherein the switch is further configured to output the second voltage to the substrate gate of the output transistor if the detected first voltage is greater than the fourth voltage.

10. The constant voltage regulator of claim 1, wherein the first voltage is less than 1.2 volts.

11. A constant voltage regulator, comprising:
    an output transistor configured to provide an output current, the output transistor having an output terminal at a first voltage and a substrate gate; and
    a switching circuit configured to:
        couple the substrate gate to a second voltage that is greater than the first voltage if the output current is greater than a reference value; and
        couple the substrate gate to a third voltage that is greater than the second voltage if the output current is less than the reference value.

12. The constant voltage regulator of claim 11, wherein:
    the output transistor further comprises a control gate, and the constant voltage regulator further comprises an output voltage controller configured to:
        generate a reference signal;
        produce a feedback signal proportional to the first voltage; and
        provide a difference sign4 representing a difference between the reference signal and the feedback signal to the control gate of the output transistor.

13. The constant voltage regulator of claim 11, further comprising a voltage converter configured to generate the second voltage based on the third voltage.

14. The constant voltage regulator of claim 11, wherein the output transistor includes a P-channel metal oxide semiconductor transistor.

15. A constant voltage regulator, comprising:
    an output transistor configured to provide an output voltage to an external host apparatus, the output transistor comprises a substrate gate; and a switching circuit configured to selectively output one of a second voltage greater than the output voltage and a third voltage greater than the second voltage to the substrate gate of the output transistor in response to an operation mode of the constant voltage regulator switchable between a first mode in which a divided voltage proportional to the output voltage is smaller than a reference voltage and a second mode in which the divided voltage is greater than the reference voltage.

16. The constant voltage regulator of claim 15, wherein:
the output transistor comprises a P-channel metal oxide semiconductor transistor;
the switching circuit is further configured to output the third voltage to the substrate gate in the first mode; and
the switching circuit is further configured to output the second voltage to the substrate gate in the second mode.

17. The constant voltage regulator of claim 15, wherein:
the first mode comprises a standby mode in which the external host apparatus is in a mode of a relatively low current consumption; and
the second mode comprises an operation mode in which the external host apparatus performs a normal operation with a current consumption greater than in the first mode.

18. A constant voltage regulator, comprising:
an output transistor configured to provide an output current, the output transistor comprises an output terminal providing a first voltage and a substrate gate; and
a switching circuit configured to:
couple the substrate gate to a second voltage that is greater than the first voltage if a second voltage proportional to the first voltage is less than a reference voltage; and
couple the substrate gate to a third voltage that is greater than the second voltage if the second voltage is greater than the reference voltage.

19. The constant voltage regulator of claim 18, wherein:
the output transistor further comprises a control gate; and
the constant voltage regulator further comprises an output voltage controller configured to:
generate the reference voltage;
provide a feedback voltage proportional to the first voltage; and
provide a difference voltage representing a difference between the reference voltage and the feedback voltage to the control gate of the output transistor.

20. The constant voltage regulator of claim 18, further comprising a voltage converter to generate the second voltage based on the third voltage.

21. The constant voltage regulator of claim 18, wherein the output transistor comprises a P-channel metal oxide semiconductor transistor.

* * * * *